A. ROSENTHAL.
LABEL AND PATCH CUTTING AND FOLDING MACHINE.
APPLICATION FILED DEC. 27, 1915.
1,262,986.
Patented Apr. 16, 1918.
12 SHEETS—SHEET 4.
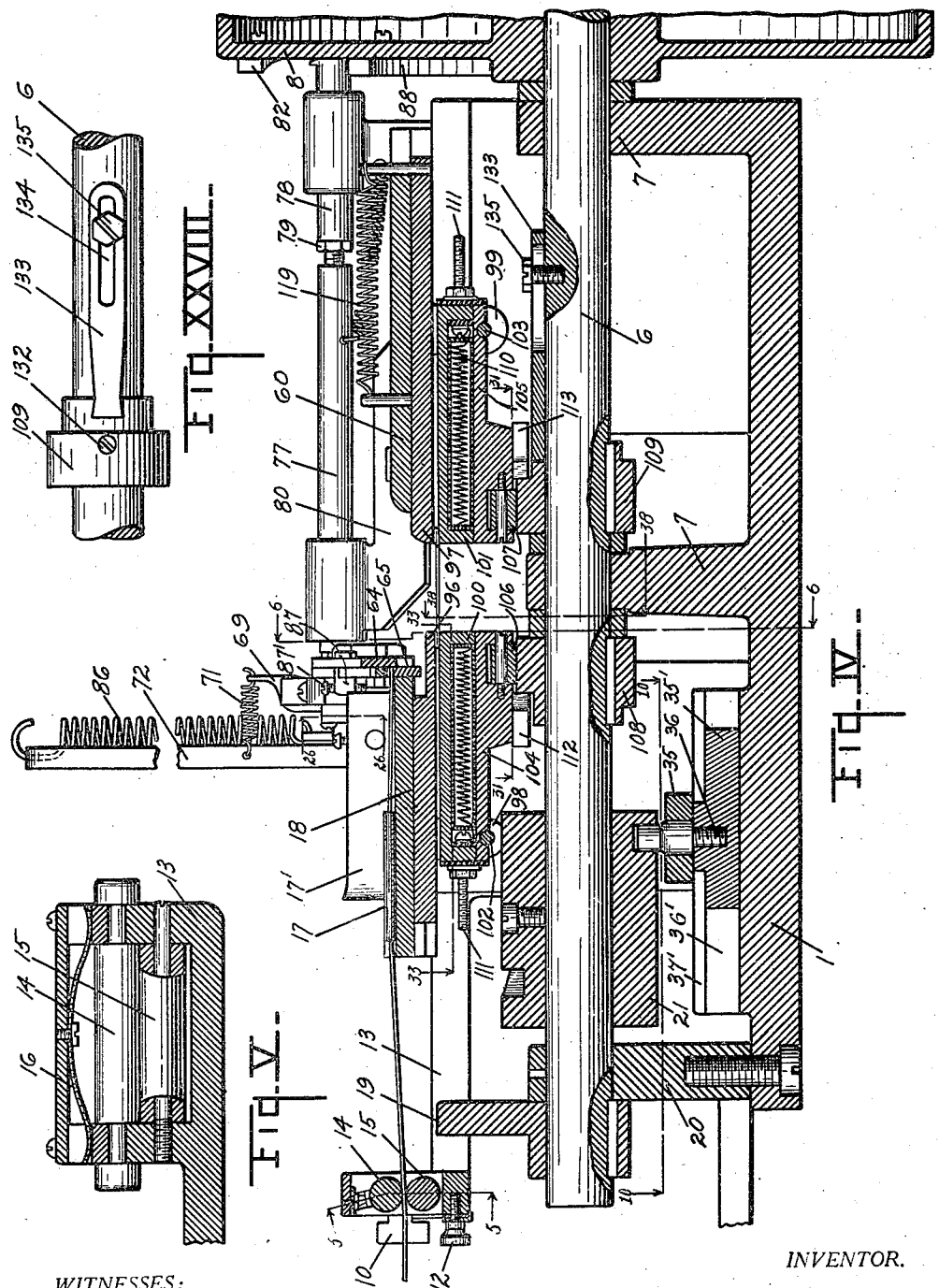
WITNESSES:
INVENTOR.
ARTHUR ROSENTHAL
BY
ATTORNEYS.

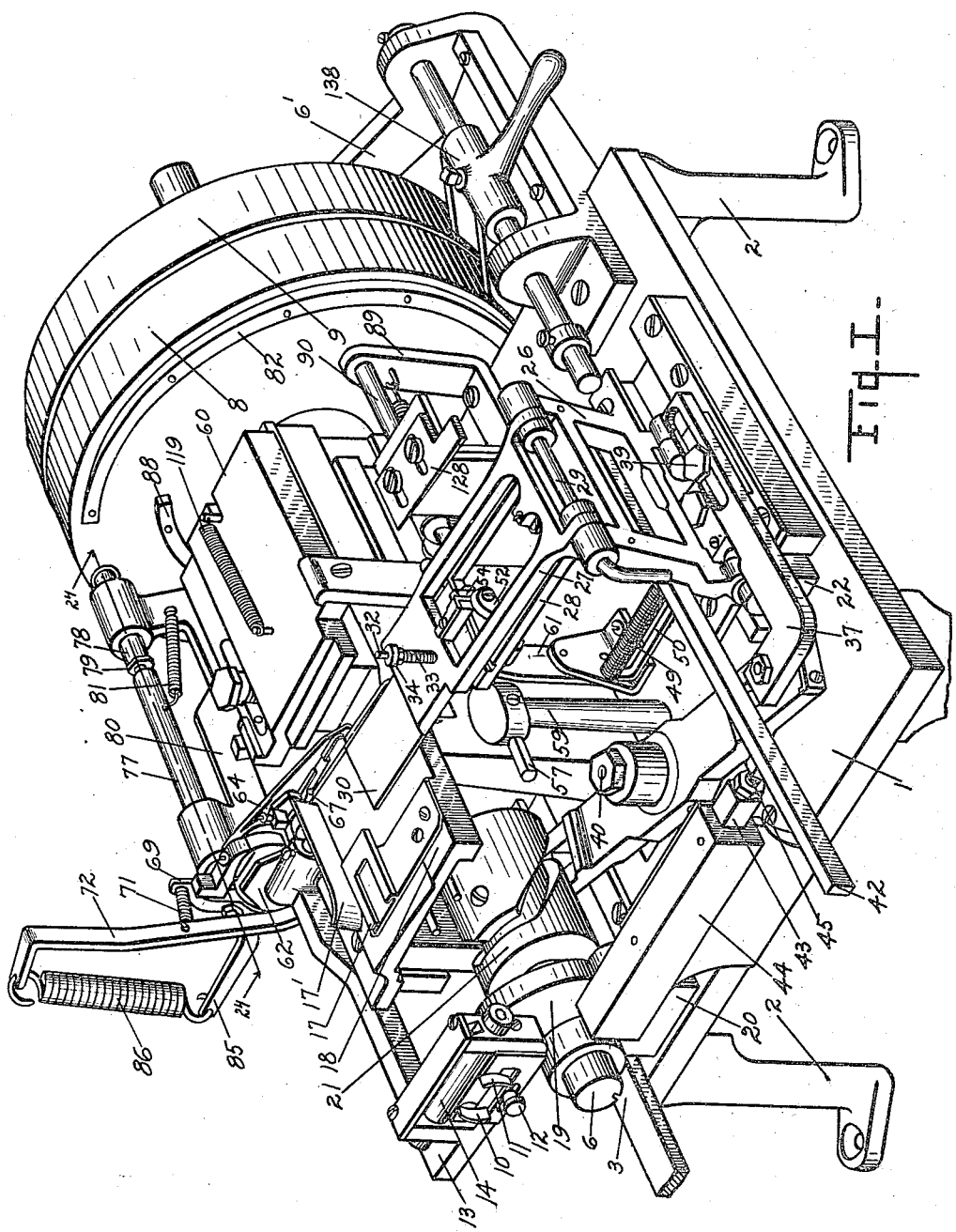

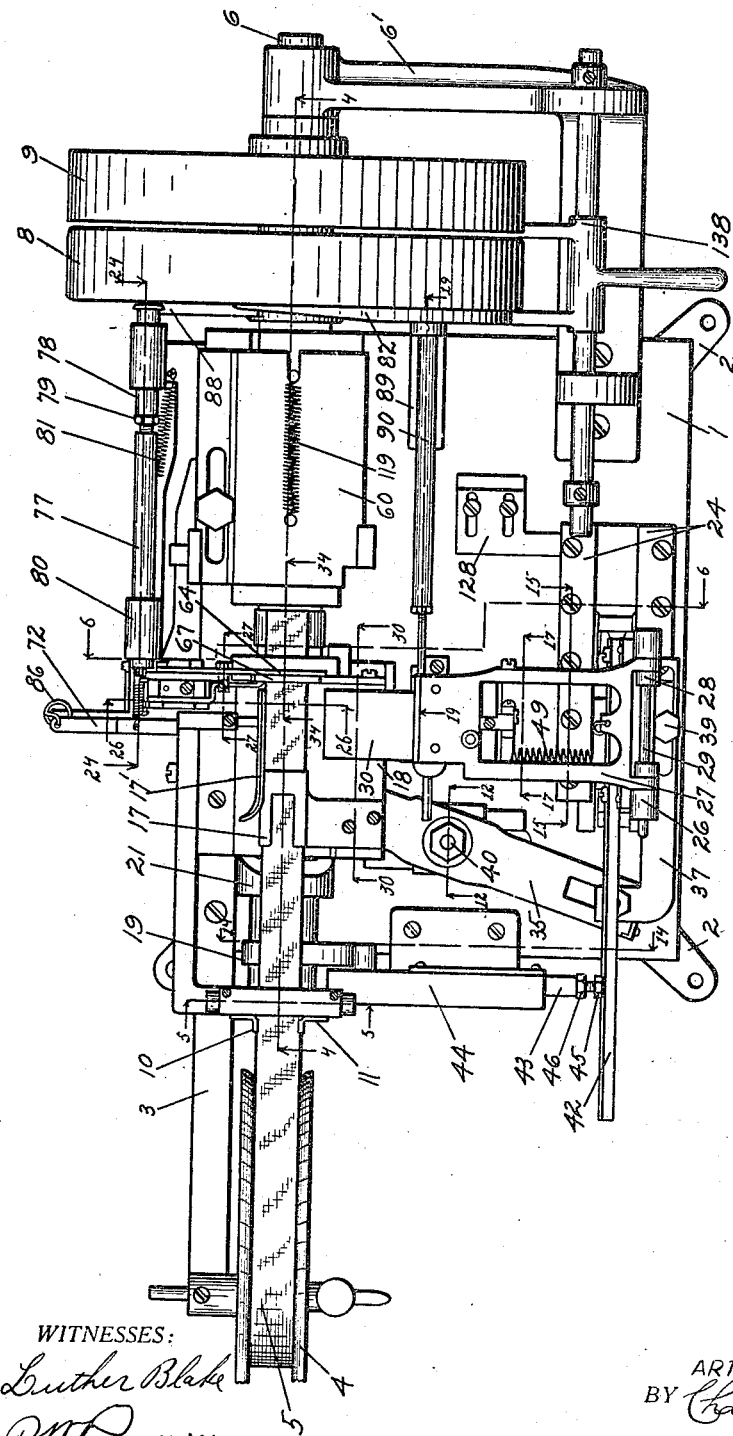

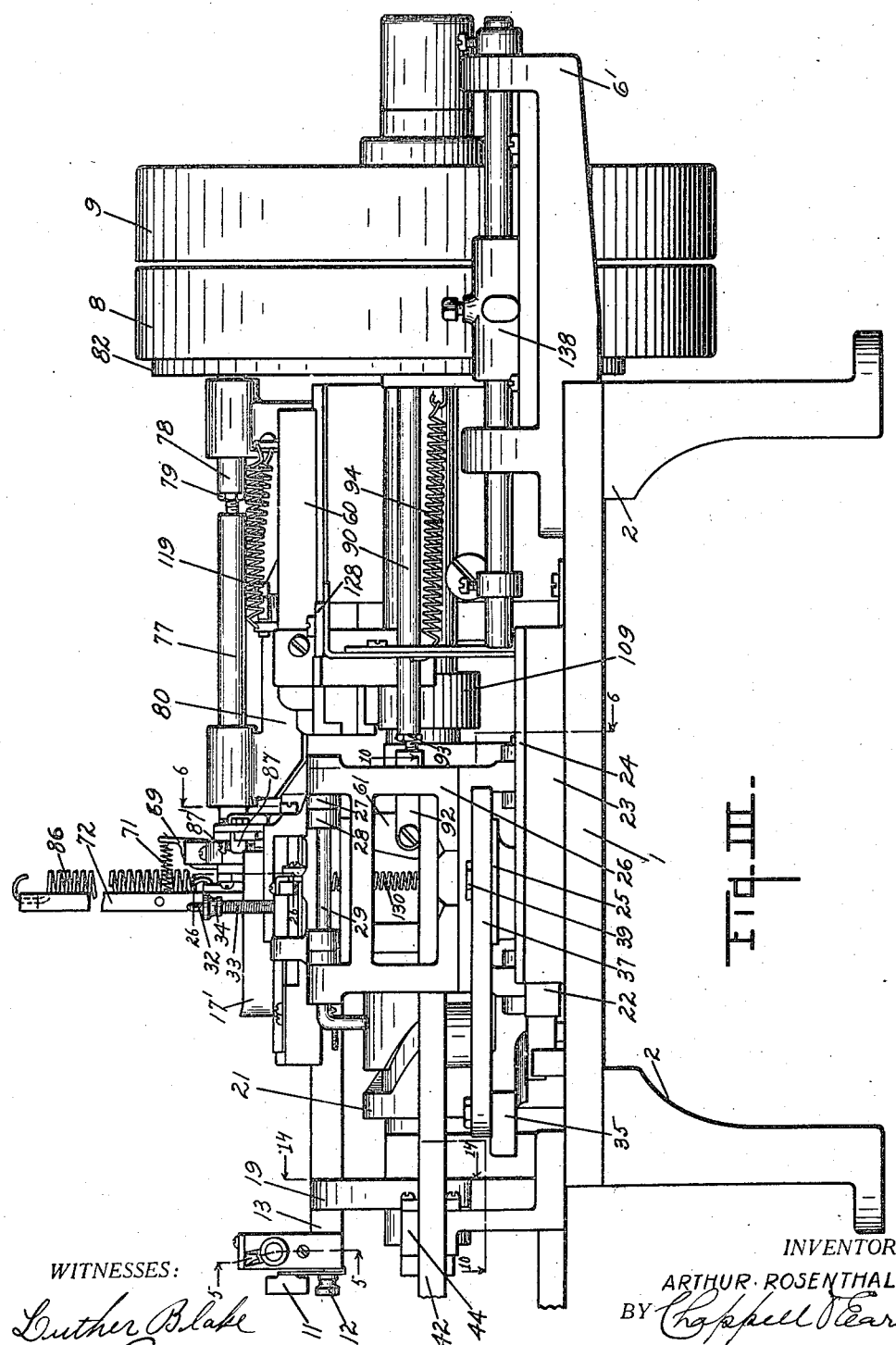

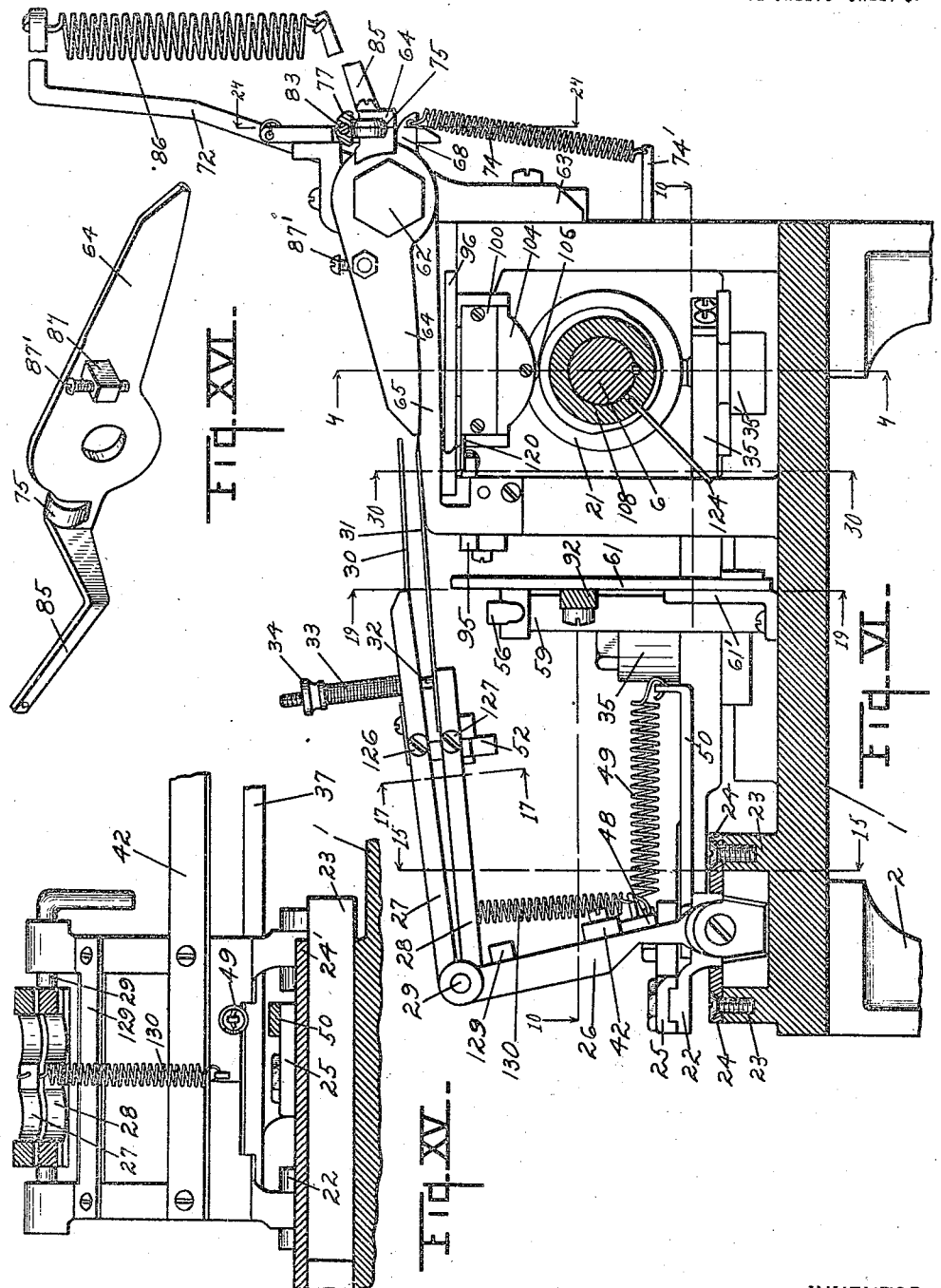

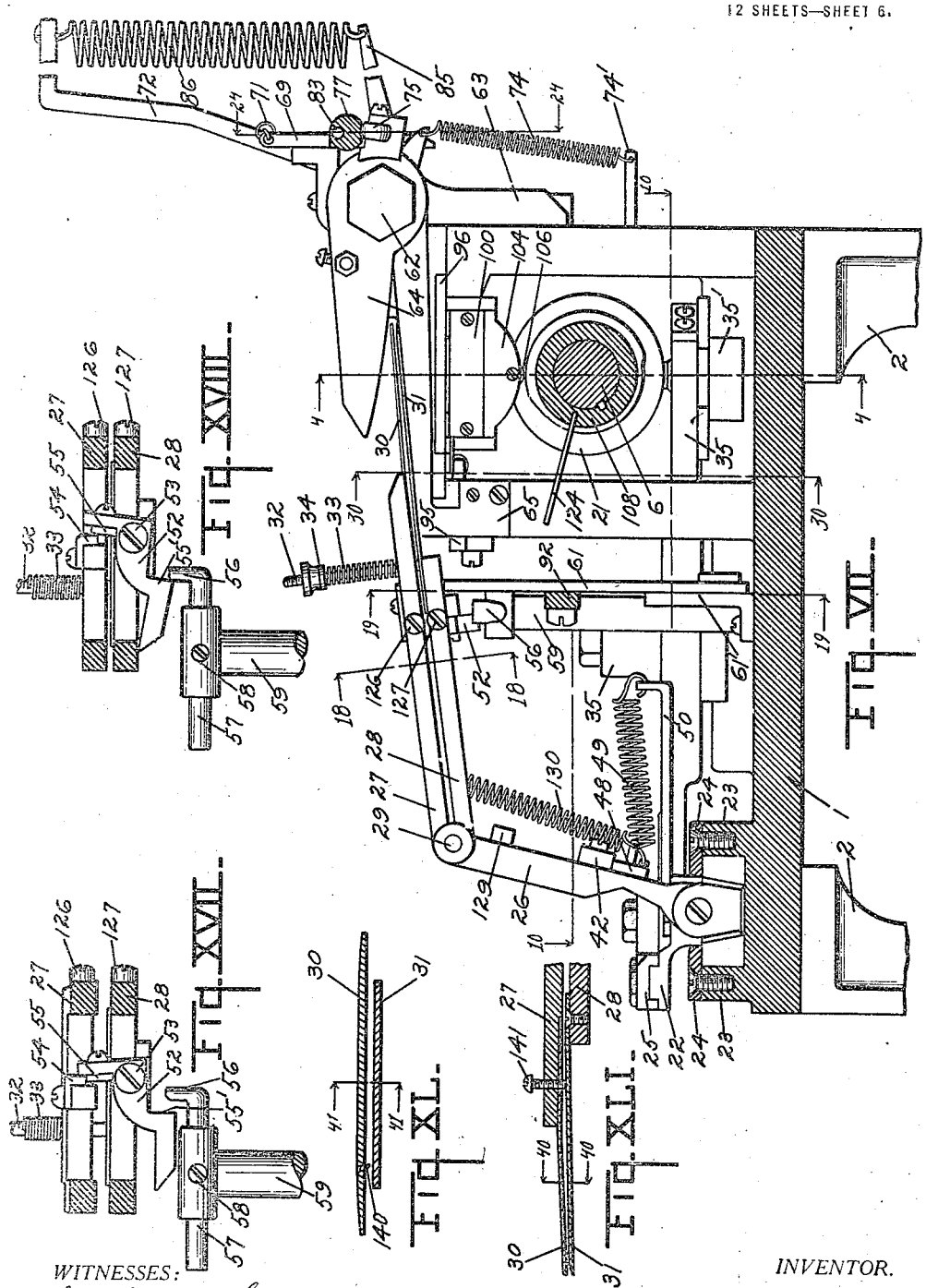

A. ROSENTHAL.
LABEL AND PATCH CUTTING AND FOLDING MACHINE.
APPLICATION FILED DEC. 27, 1915.
1,262,986.
Patented Apr. 16, 1918.
12 SHEETS—SHEET 7.
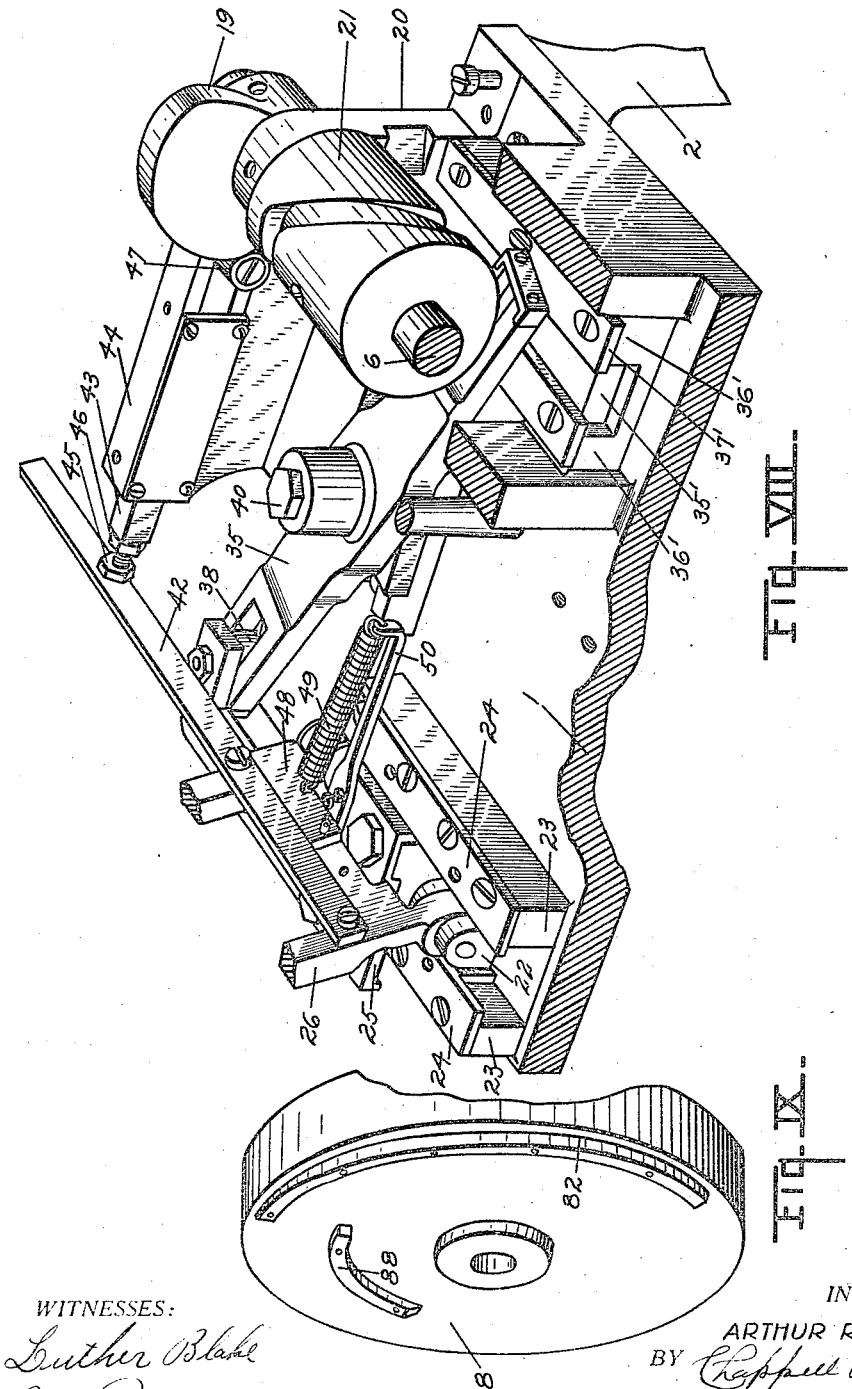
WITNESSES:
Luther Blake
P. W. Pomeroy
INVENTOR.
ARTHUR ROSENTHAL
BY Chappell & Earl
ATTORNEYS.

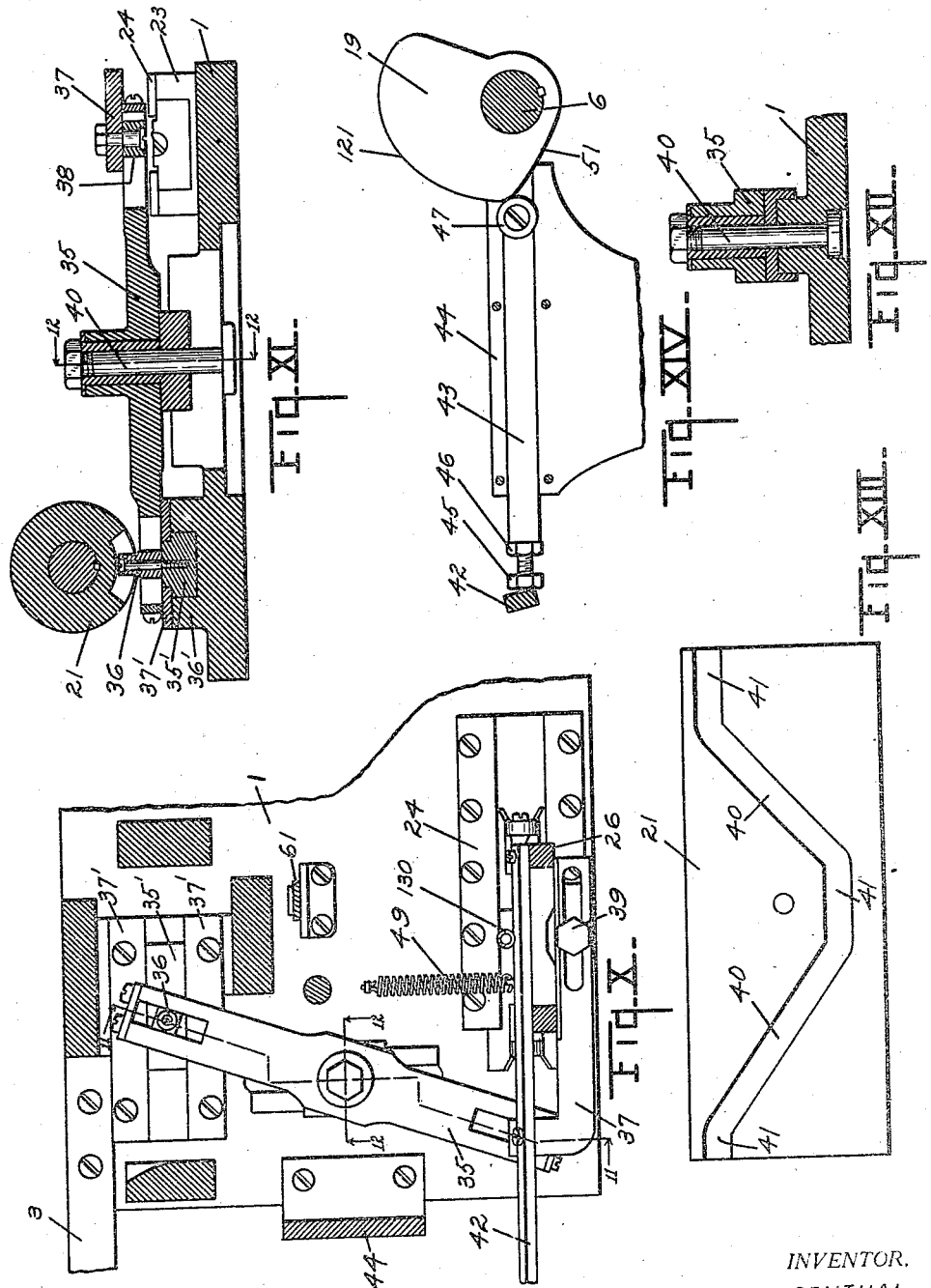

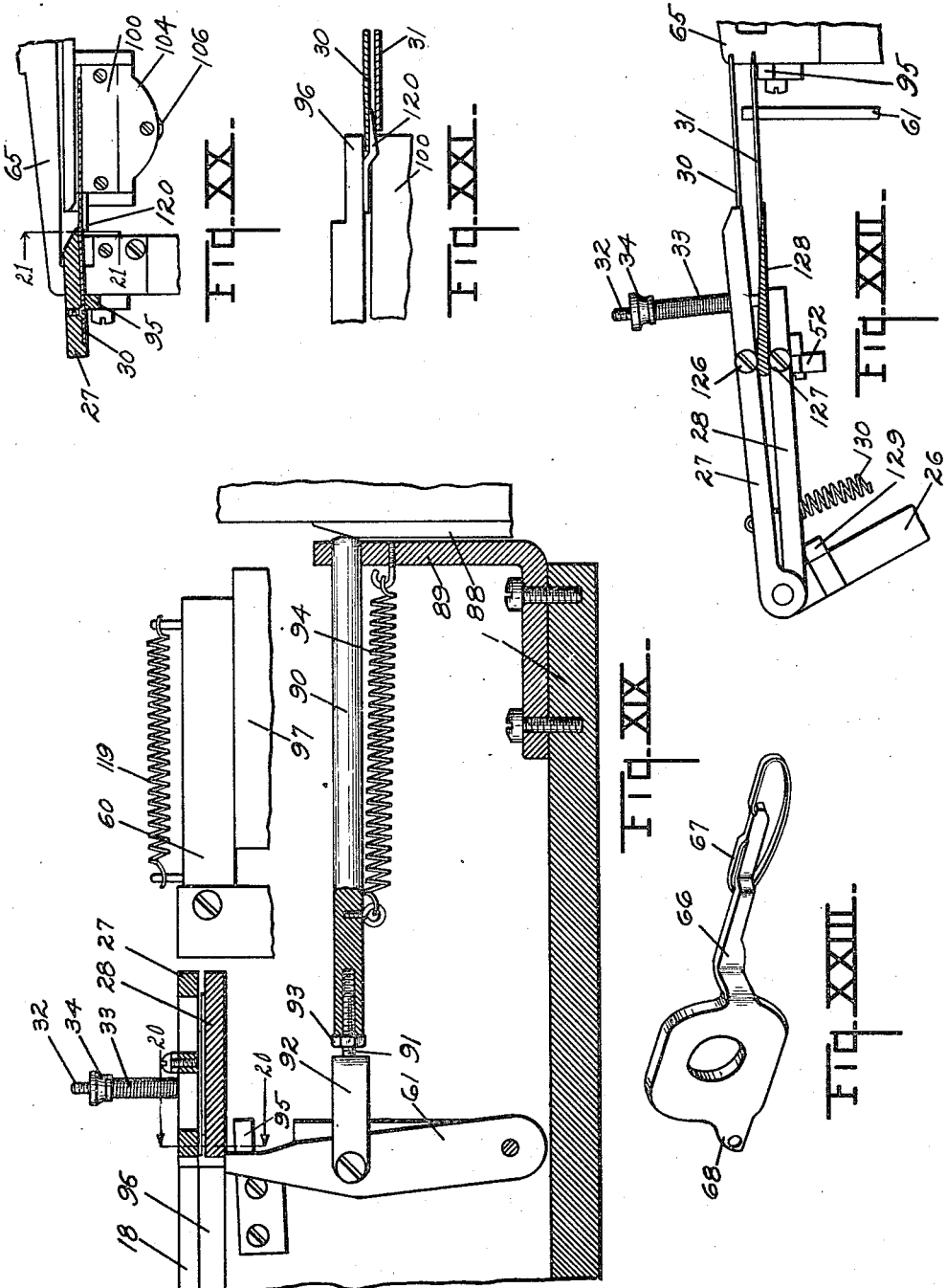

A. ROSENTHAL.
LABEL AND PATCH CUTTING AND FOLDING MACHINE.
APPLICATION FILED DEC. 27, 1915.
1,262,986.
Patented Apr. 16, 1918.
12 SHEETS—SHEET 10.
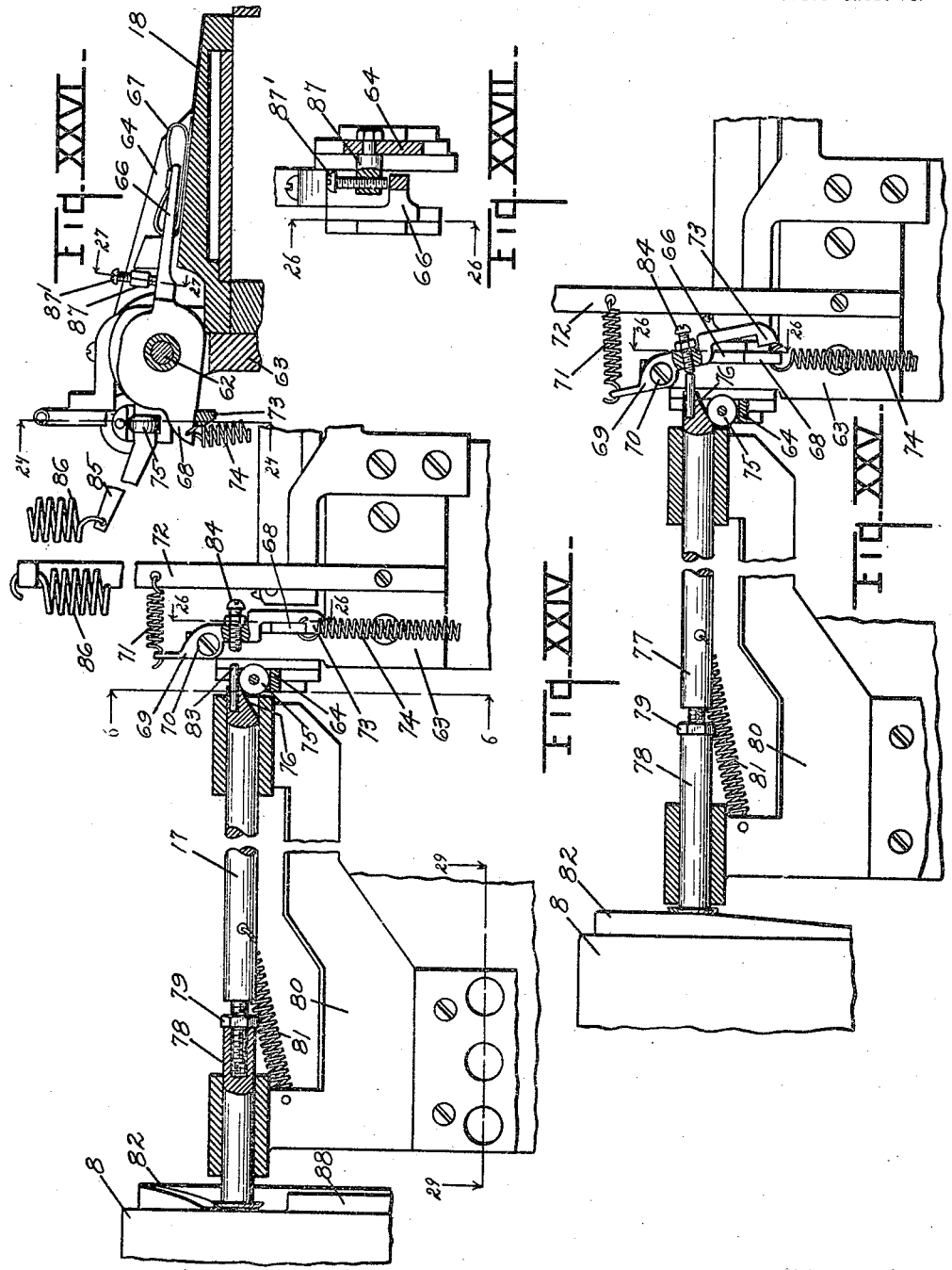
WITNESSES:
Luther Blake
P. W. Pomeroy
INVENTOR.
ARTHUR ROSENTHAL
BY Chappell & Earl
ATTORNEYS.

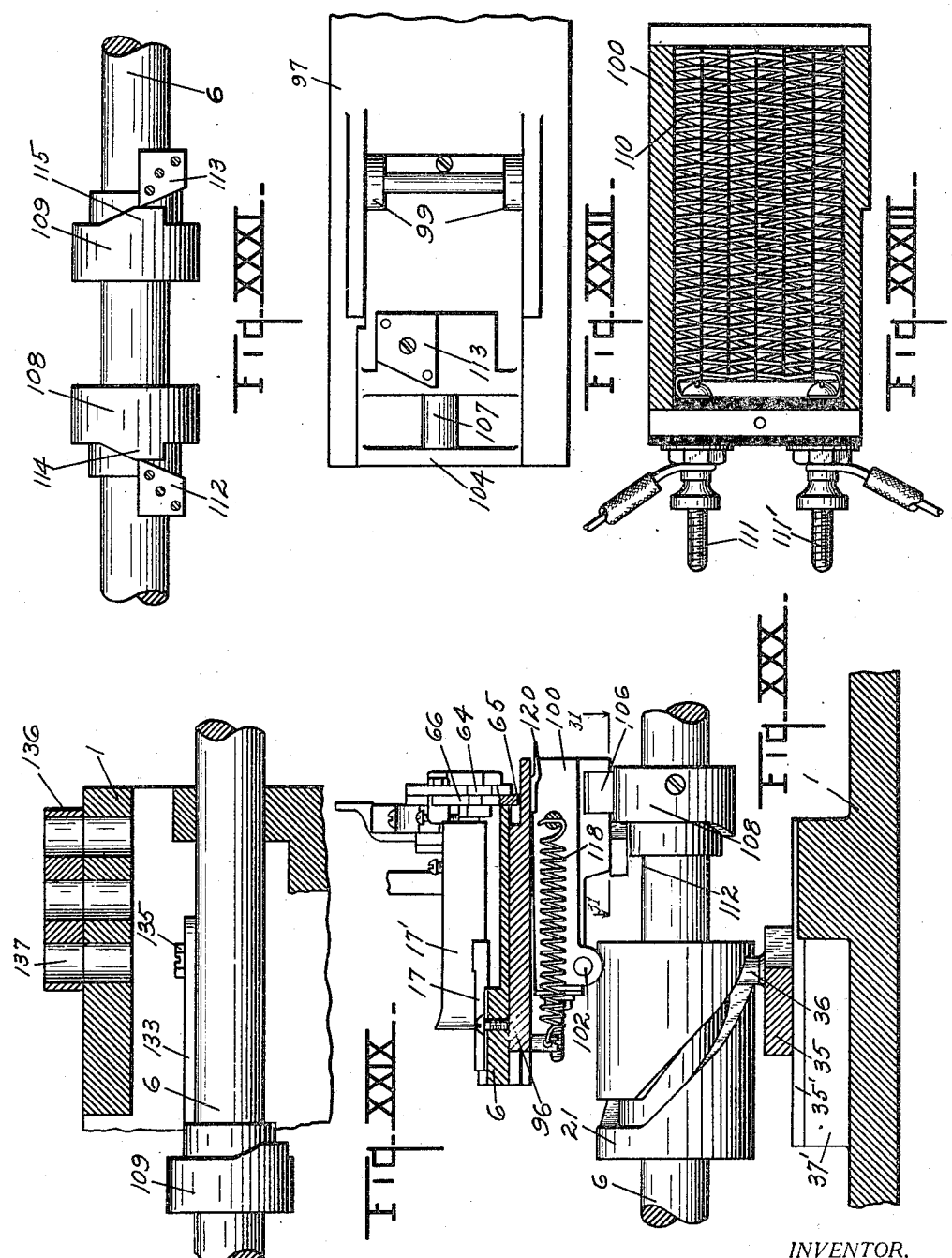

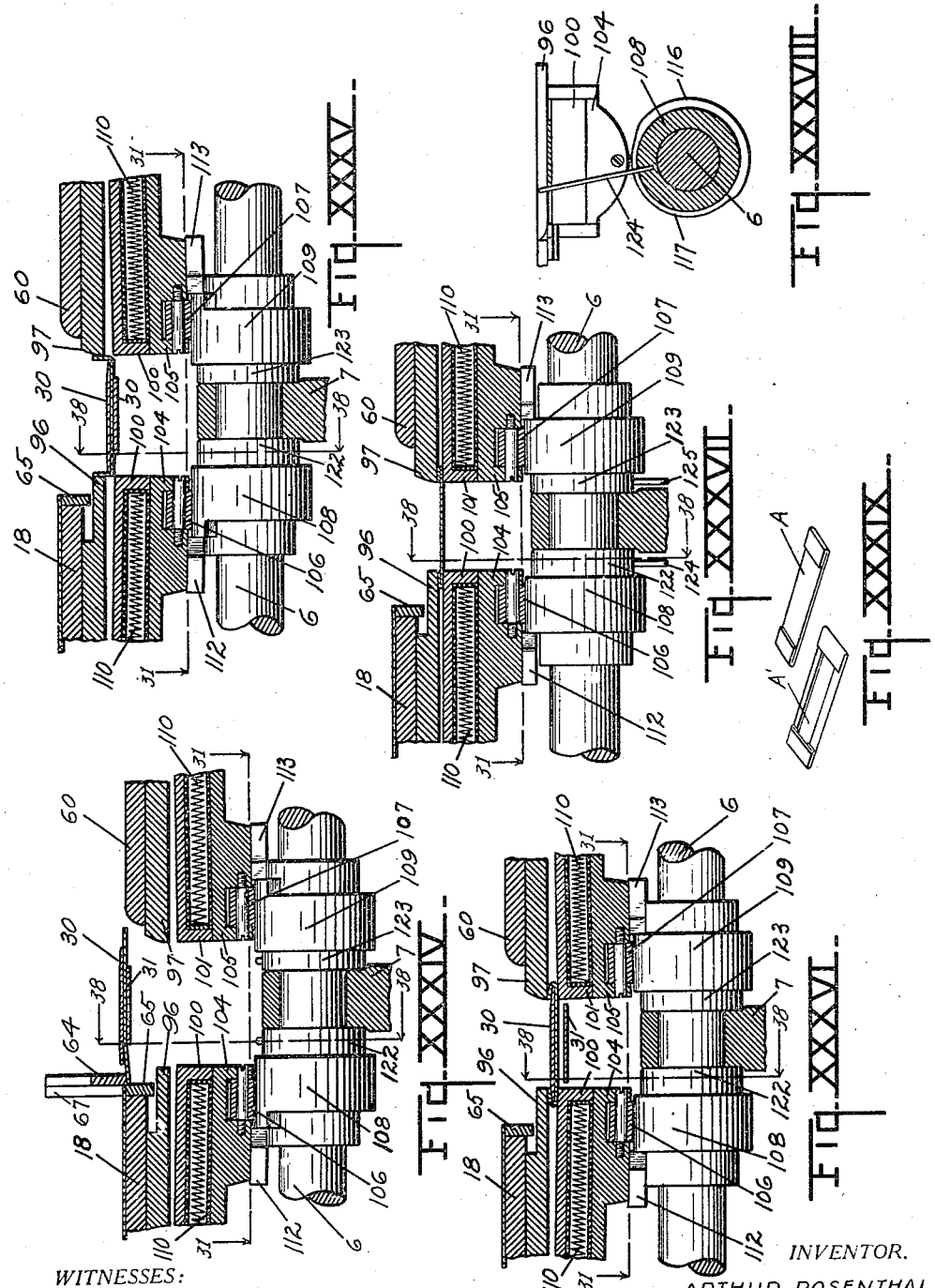

UNITED STATES PATENT OFFICE.

ARTHUR ROSENTHAL, OF GRAND RAPIDS, MICHIGAN, ASSIGNOR TO THE ROSE PATCH AND LABEL COMPANY, OF GRAND RAPIDS, MICHIGAN, A CORPORATION OF MICHIGAN.

LABEL AND PATCH CUTTING AND FOLDING MACHINE.

1,262,986.   Specification of Letters Patent.   Patented Apr. 16, 1918.

Application filed December 27, 1915. Serial No. 68,713.

*To all whom it may concern:*

Be it known that I, ARTHUR ROSENTHAL, a citizen of the United States, residing at Grand Rapids, county of Kent, State of Michigan, have invented certain new and useful Improvements in Label and Patch Cutting and Folding Machines, of which the following is a specification.

This invention relates to improvements in label and patch cutting and folding machines.

The objects of this invention are:

First, to make an improved automatic label cutting and folding machine which will take a strip of labels or tape from a reel and automatically cut the same to length and fold and crease the ends.

Second, to provide improvements in the folding devices whereby the even and square folding of the opposite ends or sides of each label is secured.

Third, to provide an improved cut off means for severing the label from the strip.

Fourth, to provide an improved gripper which delivers the label when cut off to the folder ironer jaws.

Fifth, to provide an improved gripper for delivering the label from the reel to the cut-off means which will take care of the variation in length of such label due to variations in the weaving thereof.

Sixth, to provide in a machine of the type described, a means for heating the folder ironer jaws so that the same will have an ironing effect on the label when folded and during the folding operation.

Seventh, to provide a machine of the type described, of such structure that toothed gearing is unnecessary for the operation thereof.

Further objects, and objects relating to detail and economies of construction and operation will definitely appear from the detailed description to follow.

I accomplish the objects of my invention by the devices and means described in the following specification. The invention is clearly defined and pointed out in the claims.

A structure constituting a preferred embodiment of my invention is illustrated in the accompanying drawings forming a part of this specification, in which:

Figure I is a perspective view of an automatic label cutting and folding machine embodying the features of my invention.

Fig. II is a plan view of my improved label cutting and folding machine.

Fig. III is a front side elevation of my machine.

Fig. IV is an enlarged partial detail longitudinal section showing the folding and various cam means for the operation of the machine, taken on line 4—4 of Figs. II, VI, VII.

Fig. V is an enlarged detail vertical section through the label tension feed rolls taken on line 5—5 of Figs. II, III and IV.

Fig. VI is an enlarged detail transverse section of my machine showing the gripper folder plates opened and in their front positions, taken on irregular section line 6—6 of Figs. II, III and IV.

Fig. VII is an enlarged detail transverse section showing the gripper folder plates closed and in their back positions, taken on the same section line as that of Fig. VI.

Fig. VIII is an enlarged partial perspective view of the cam means for the longitudinal operation of the gripper carriage.

Fig. IX is a perspective view of the driving pulley and the face cams thereon for controlling the shear means and assisting in the operation of the grippers.

Fig. X is a detail sectional plan view showing the cam levers for operating the gripper carriage, taken on section line 10—10 of Figs. III, IV, VI and VII.

Fig. XI is a detail vertical section through the cam levers for operating the gripper carriage taken on the broken section line 11—11 of Fig. X with the cylinder cam being added and in section.

Fig. XII is a detail vertical section showing the mounting of the gripper cam lever, taken on section line 12—12 of Figs. II, X and XI.

Fig. XIII is an enlarged plan view showing the development of the gripper cam.

Fig. XIV is a detail partial transverse section showing the cam and its mechanism for the transverse operation of the gripper, taken on section line 14—14 of Figs. II and III.

Fig. XV is an enlarged detail vertical section through the gripper jaws and the gripper carriage, taken on section line 15—15 of Figs. II and VI.

Fig. XVI is an enlarged perspective view of the movable shear blade which is the upper blade.

Fig. XVII is an enlarged detail vertical section showing the trip mechanism for closing the gripper jaws taken on section line 17—17 of Figs. II and VI with the jaws open.

Fig. XVIII is an enlarged partial detail vertical section through the gripper jaws after the trip mechanism has been operated to close the same, showing the jaws closed taken on section line 18—18 of Fig. VII.

Fig. XIX is an enlarged partial detail vertical section through the gripper jaws showing the mechanism for dropping and positioning the gripper folder plates in line with the folder ironer jaws, taken on section line 19—19 of Figs. II, VI and VII.

Fig. XX is a partial detail vertical section showing the upper gripper jaw as positioned prior to the folding of the label over the upper folder gripper jaw, taken on line 20—20 of Fig. XIX.

Fig. XXI is an enlarged detail vertical section showing the finger for spreading the gripper plates apart when releasing the label, taken on section line 21—21 of Fig. XX.

Fig. XXII is an enlarged detail vertical section showing the gripper jaws when opened by the wedge plate.

Fig. XXIII is a perspective view of the clamping arm which securely holds the label to the table when the same is cut by the shears.

Fig. XXIV is an enlarged detail vertical section through the plate cam operating mechanism for actuating the movable shear means, taken on section line 24—24 of Figs. I, II, VI, VII and XXVI.

Fig. XXV is an enlarged detail vertical section showing the relation between the label clamping and shearing means after the latter has been actuated, taken on the same section line as that of Fig. XXIV.

Fig. XXVI is an enlarged partial detail vertical section through the label clamping and shearing means taken on section line 26—26 of Figs. II, III, IV, XXIV, XXV, XXVI and XXVII.

Fig. XXVII is an enlarged partial detail vertical section through the label clamping and shearing means taken on section line 27—27 of Figs. II and XXVI.

Fig XXVIII is an enlarged plan view of the cam for actuating the movable label folder ironer jaw and the adjusting finger for the same on the main drive shaft.

Fig. XXIX is an enlarged detail vertical section showing the folder jaw cam adjustment and the accessibility of the same taken on section line 29—29 of Fig. XXIV.

Fig. XXX is an enlarged detail vertical section showing the gripper cam and the cam means for actuating the movable folder ironer jaw, taken on section line 30—30 of Figs. II, VI and VII.

Fig. XXXI is an enlarged detail horizontal section of the main drive shaft with the folder jaw actuating cams thereon, taken on section line 31—31 of Figs. IV, XXXIV, XXXV, XXXVI and XXXVII.

Fig. XXXII is a bottom plan view of the label folder ironer jaws.

Fig. XXXIII is a detail horizontal section showing the electric heating coils of the movable folder jaws, taken on section line 33—33 of Fig. IV.

Fig. XXXIV is an enlarged partial detail vertical section through the gripper plates and the folder jaws immediately after the label has been severed from the strip, taken on line 34—34 of Fig. II.

Fig. XXXV is an enlarged partial detail vertical section through the gripper plates and the folder jaws prior to the latter folding the label, taken on line 34—34 of Fig. II.

Fig. XXXVI is an enlarged partial detail vertical section through the gripper plates and the folder jaws prior to the former being withdrawn from the label and the latter commencing the folding of the same, taken on line 34—34 of Fig. II.

Fig. XXXVII is an enlarged detail vertical section showing the label folded and the same between the folder jaws taken on line 34—34 of Fig. II.

Fig. XXXVIII is an enlarged detail vertical section showing the means for ejecting the label after the same has been folded taken on section line 38—38 of Figs. IV, XXXIV, XXXV, XXXVI and XXXVII.

Fig. XXXIX is a perspective view of the folded labels.

Fig. XL is an enlarged detail vertical section of the gripper plates showing the same modified for use in connection with labels having woven letters thereon, taken on section line 40—40 of Fig. XLI.

Fig. XLI is an enlarged detail vertical section showing the modified means for providing an adjustment between the gripper plates taken on section line 41—41 of Fig. XL.

In the drawings similar reference characters refer to similar parts throughout the several views, and the sectional views are taken looking in the direction of the little arrows at the ends of the section lines.

A brief description of the operation of the machine is as follows: A strip of labels or tape is led and guided from a suitable reel to the work table. The end label is then securely gripped between a pair of gripper folder plates; these gripper folder plates are moved longitudinally and a single label is severed from the strip by the shear means. The gripper then drops a short distance between the pairs of end folding jaws and in so doing the projecting ends of the label held by the said gripper folder plates, wipe against the edges of the end folder jaws. This, therefore, completes half of the necessary fold. The end folder jaws which have previously been opened are then actuated toward each other to complete the other half of the fold of the label over the top folder gripper plate. The gripper is then withdrawn and the end folder jaws are pressed together at each end of the label which is between each pair of folder jaws, and the label will be thus properly creased. The lower jaw of each pair of end folder jaws is heated. The heat of the said jaws serves to give a sharp crease, and completely iron the label. The folder jaws are then opened and suitable fingers eject the folded label from the machine, the gripper having in the meantime returned to its original position.

Considering the numbered parts of the drawings, the mechanism of the machine is carried on the base plate 1 suitably supported by the legs 2. The base plate 1 has a number of projecting arms for supporting the various mechanisms as will hereinafter be shown.

On the base plate 1 is fastened the arm 3 which supports the reel 4 for carrying the roll 5 being a strip of labels, tape or other material.

The main drive shaft 6 of my machine is suitably journaled in the arms 7 and bracket 6′ (Figs. II and IV). On the end of the said shaft are tight and loose pulleys 8 and 9 respectively. The shaft 6 and the pulley 8 with suitable face cams thereon serve to actuate the various mechanisms in my machine.

The label strip is led from the roll 5 through a pair of guide fingers 10 and 11 supported on arm 13 carried by face plate 1, (Figs. I, II and III). These fingers are adjustable so as to suit any desired width of tape and are held in place by the thumb screw 12. On the arm 13 is journaled a pair of tension rolls 14 and 15 respectively. (Figs. I and V). The upper roll 14 is yieldingly held against the lower roll by the spring 16. The label strip passes between the two rolls and through the guide 17 securely fastened to the adjustable and forwardly sloping work table 18 and against guide strip 17′. (Figs. I and II).

On the left end of the main drive shaft 6 is secured the disk cam 19. The end of said shaft is here supported by the arm 20 secured to the base plate 1. Toward this end of the shaft and keyed thereto is also the cylinder cam 21. These two cams serve to actuate the gripper means transversely and longitudinally, respectively to grip and feed the label or patch forward.

The gripper means, which I have employed, consists of the gripper carriage 22 which reciprocates longitudinally between a pair of ways 23 (Fig. VIII) and top guide bars 24 securely fastened to the said ways. On top of the gripper carriage is secured the carriage top plate 25. Journaled on the gripper carriage is a pivotally mounted frame-like gripper rock arm 26. Pivotally mounted on pivot 29 at the upper end of the gripper rock arm are the upper and lower gripper jaws 27 and 28 respectively, (Fig. VI). At the ends of the said gripper jaws are fastened the upper and lower gripper folder plates 30 and 31, respectively.

Secured to the lower gripper jaw 28 is the stud 32 which passes through a suitable perforation in the upper gripper jaw. Around this stud and above the upper gripper jaw is the coil spring 33. The thumb nut 34 screws on the said stud and varies the compression of the spring 33. The said spring, therefore, yieldingly holds the gripper jaws and plates together.

A cam lever 35, pivotally fulcrumed on the base plate 1, is suitably slotted at each end. In the rear end slot slides the squared portion of cam roller 36, the upper portion of the roller itself engaging the groove of cam 21. Roller 36 is secured to the cam roller slide 35′, reciprocating on the base plate 1 between the side and top guides 36′ and 37′, respectively. The gripper carriage arm 37 secured to the carriage top plate 25 has a roller 38 pivotally mounted at the end thereof, said roller being adapted to engage the front slotted end of the said cam lever. The other end of the carriage arm 37 is also slotted and a set screw 39 passing through the said slotted end serves to allow an adjustment of the said arm on the said carriage top plate. The cam lever 35 is suitably fulcrumed on the bolt 40 as shown in Fig. XII. This fulcrum is adjustable, the base being slotted for the purpose. See Fig. XI. The development of the cylinder cam 21 is shown in Fig. XIII. It is therefore seen that as the same rotates, the gripper carriage will reciprocate when the cam roller is in contact with the slanting portions 40 of the groove, but when the said roller contacts with the straight portions 41 of the groove, the carriage will be at rest. This, therefore, permits the exact timing of the carriage as will hereinafter be shown.

Securely fastened in fixed relation to the carriage rock arm 26 is the rock arm rod 42. A push rod 43 (Figs. I, VIII and XIV) is slidably mounted in the push rod guide 44 which is secured to the base plate 1. On the front end of the push rod is a push rod adjusting screw 45. The same bears against the rod 42 and after an adjustment has been made, the set screw is secured by the lock nut 46. On the other end of the push rod is the cam roller 47. At the lower end of the carriage rock arm is the plate 48 (Fig. VIII) to which is fastened one end of the spring 49. The other end of spring 49 is fastened to the hooked arm 50 which is secured to the carriage top plate 25. By means of spring 49, the rod 42 is yieldingly held against the push rod screw 45 and cam roller 47 is always in yielding contact with cam 19. Therefore, the rotation of cam 19 gives an intermittent transverse movement to the gripper jaws.

The initial or front position of the gripper jaws is shown in Fig. I where the lower folder gripper plate rests on table 18 and the gripper carriage is at its extreme left hand position. The same is held stationary as the cam roller 36 engages one of the straight portions 41 of cam 21. However, during the period of rotation of the drive shaft while the said roller 36 is in engagement with the said portion 41, the lower dwell 51 of the cam 19 permits the gripper jaws to travel backward. It is during this backward movement of the gripper jaws that the same are positioned on the table 18 with the end label of the label strip between the gripper folder plates. As the advancing edge of the lower folder gripper plate is beveled, as shown in Fig. VI, it is evident that the label strip, as it lies on table 18, will be placed and laid between the open plates when the same are moving backward and the end of the strip is held to the said table by spring means hereinafter described. Just before this backward movement of the gripper is completed, the cam 21 has rotated sufficiently so that the gripper carriage commences to move to the right (Fig. XXX). At this instant the gripper jaws close and that portion of the label between the plates is grasped by the said closing of the grippers. These jaws are closed by a trip means.

Pivotally mounted on the lower gripper jaw 28 is trip 52 pivoted on screw pin 53 (Figs. XVII and XVIII). Secured to the upper gripper jaw 27 is the catch 54. This catch 54 is adapted to contact with the trip plate 55 secured to trip 52. The position of these parts when the trip is set or when the jaws are open, is shown in Fig. XVII. The spring 33 yieldingly holds the parts in this position. The lower part of trip 52 has the shouldered portion 55'. This shoulder is adapted to engage the adjustable stop 56, which is the upturned end of the pin 57 adjustably secured by set screw 58 to the upright arm 59 mounted on the base plate 1. Therefore, when the gripper plates have reached the position hereinbefore mentioned and the gripper carriage starts to the right, the stop 56 engages the shoulder 55' of catch 52 and as it turns about screw pin 53, plate 55 disengages catch 54 and the gripper folder plates come together securely gripping the label strip, therebetween, by the action of spring 33.

During the travel of the carriage to the right, the cam 19 does not operate the gripper rock arm as the dwell portion of the cam bears against the roller 47.

Spaced to the right of work table 18 is the adjustable work table 60. The carriage travels to the right until the gripper folder plates are between the said work tables. When in this position, the gripper jaws are prevented from dropping by resting on the top end of the lever 61 which is in line with the bottom face of gripper jaw 28 (Figs. VII and XIX), and also while in this position, the label is cut from the strip. The cutting is done by a quick stroke.

Lever 61 is pivoted to the bracket 61' suitably secured to the base plate 1. When the gripper folder plates travel to the right, the shear and clamping means are opened so as to permit said plates to position themselves between the work tables and carry the label to the cut off position.

On the bolt 62 (Figs. I, VI and XXVI) secured to a bracket 63 fastened to the base plate 1 is journaled the upper movable shear blade 64. The stationary shear blade 65 (Fig. XXXIV), is secured to the end of table 18. Also journaled on bolt 62 and next to the upper shear blade 64 is the clamping arm 66 having the downwardly bowed spring clamp 67 at the end thereof to hold the end of the label strip after the label or patch has been cut off. At the rear of clamping arm 66 projects the finger 68. Also on bracket 63 is the catch 69 mounted on the screw 70. The upper end of catch 69 is fastened by spring 71 to the arm 72 also secured to bracket 63. The lower end of catch 69 has the catch finger 73 adapted to engage the finger 68 of clamping arm 66 (Fig. XXVI). Spring 74 puts tension on finger 68, extending from the said arm to the bracket 74' (see Fig. VI).

At the rear of shear blade 64 is pivotally mounted a roller 75 (Figs. XVI and XXIV). This roller is adapted to engage beveled face 76 of cam rod 77. Cam rod 77 has a screw connection to the cam push rod 78 and the two are locked by lock nut 79. Both rods 77 and 78 are suitably supported in the bearing bracket 80 secured to the base plate 1. Push rod 78 is held in yielding contact by spring 81 with the circular face cam 82 secured to the main pulley wheel 8. Above the beveled portion 76 of cam rod 77 is secured the pin 83. This pin is adapted to engage the stop screw 84 which is adjustably secured to the catch 69. In Figs. XXIV and XXVI, the catch 69 is shown as engaging the finger 68 and holding the clamping arm 66 against the table 18 while the shear blade 64 is shown in its down position. Therefore, as driving wheel 8 revolves, cam 82 will actuate the cam rod 77 and the beveled portion 76 bearing against the roller 75 will raise the shear blade 64 (Fig. VII). Simultaneously with this operation, the pin 83 contacting with set screw 84 will disengage the catch 73 from the finger 68 and the clamping arm 66 will fly upward due to the action of spring 74. This action just described is timed and takes place at about the same time that the gripper carriage commences to travel toward the right and the clamping arm and the shear blade are both raised so as to permit the gripper folder plates to pass beneath them.

By the time the plates are positioned between the tables 18 and 60, the driving wheel 8 has rotated until the push rod 78 is nearly at the end of cam 82. From the rear of the shear blade 64 projects the arm 85 (Figs. I and XVI), said arm connecting the tension spring 86 to an overhanging portion of arm 72. The spring 86 therefore tends to keep the shear blade in a closed position or to keep the roller of the same in yielding contact with cam rod 77 and serves when the same is released to actuate the shear.

On the cutting face of the shear blade 64 is secured the block 87 having a stop screw 87' therein (Fig. XVI). The stop screw 87' is positioned and adapted to bear against the clamping arm 66 (Fig. XXVI). Therefore, when the shear blade is in its upward position, the upward position of the clamping arm is determined when the same bears against stop screw 87' due to spring 74. Therefore, when push rod 78 reaches the end of cam 82, the former drops off the latter and cam rod 77 and pin 83 suddenly disengage the roller 75 and stop screw 84 respectively, and the shear blade flies down and severs the label from the strip. However, the instant the shear blade starts downward, the stop screw 87' bearing against the clamping arm 66 will bring the same down with the said blade. The spring 67 at the end of arm 66 will flatten itself against the end of the label strip on the table 18. This, therefore, holds the strip securely and as the spring 67 is right next to the blade 64 and the bow of the same being in advance of the blade the latter makes a clean sharp cut across the label. Also when the shear is operated the spring 71 actuates the catch 69 and as the clamping arm will be down, the catch finger 73 will again engage finger 68 of the said clamping arm. The shear blade and clamping arm are held down during the remaining operation of the machine and are not lifted until the gripper plates are ready to grip the label as previously described. The spring 67, therefore, holds the end of the label strip on table 18 so the gripper folder plates may pass above and beneath the strip as hereinbefore described.

As soon as the label is severed from the strip, the lever 61 (Fig. XIX) is actuated and disengages and drops the gripper jaws. On driving wheel 8, there is also the face cam 88. From the base plate 1 upwardly projects the bracket plate 89. In said bracket plate slides the cam push rod 90 in the end of which is the adjusting screw 91 with its lock nut 93. Adjusting screw 91 is secured to the lever arm 92 which is pivotally mounted on lever 61. A tension spring 94 serves to hold the push rod 90 yieldingly against the wheel 8 or the cam 88. Therefore, just after the label is severed, the beveled advancing end of cam 88 actuates the push rod 90 which in turn operates the lever 61 disengaging the gripper jaws and dropping the same.

On the front end of one of the posts which support table 18 is a projecting stop 95. The front end of gripper jaw 28 is partially cut away and the lower gripper folder plate 31 is narrower than the upper gripper folder plate 30. Therefore when lever 61 releases the gripper jaws, the same will fall and be caught by the upper gripper folder plate dropping on the stop 95, (Fig. XX) the said cut away portion of the lower jaw and the narrower lower gripper folder plate permitting this.

Beneath the tables 18 and 60 are a pair of oppositely disposed upper ironer folder jaws 96 and 97 respectively. (Fig. IV). Both of these jaws are slidably carried by their respective tables. From each of the said jaws 96 and 97 project a pair of depending lugs 98 and 99 respectively. Between the said lugs 98 and 99 are pivotally mounted the lower end ironer folder jaws 100 and 101 on pivot pins 102 and 103 respectively. Each of the jaws 100 and 101 has a bottom cover plate 104 and 105 respectively. In each bottom plate is journaled a cam roller 106 and 107. These cam rollers are adapted to coact with combination cylinder and edge cams 108 and 109, each cam being securely keyed to the main drive shaft 6. The contour of the cylindrical surface of these two cams is shown in Fig. XXXVIII, while the contour of the edge portion of these two cams is shown in Fig. XXXI.

In the chamber formed between the lower ironer end folder jaws and their bottom covers is located the heating means which consists of the common electric resistance coils 110 serving to keep the said folder plates at a uniform temperature. The plan view of these coils is shown in Fig. XXXIII. Terminals 111 and 111' serve to connect the coils to the outside circuit.

On the under side of the end folder bottom jaws are the cam followers 112 and 113. These followers are adapted to coact with the outside edges of cams 108 and 109, and are held in yielding contact with the same by tension springs 118 and 119 (Figs. IV and XXX). These springs are fastened at one end to pins secured in the top end folder plates as shown and the other end secured to pins retained by the tables 18 and 60. The edges of cams 108 and 109 have raised portions 114 and 115.

While the machine has been performing the operations previously described, the cam rollers 106 and 107 are resting on the upper dwell 116 of each cam (Fig. XXXVIII), the weight of the lower end folder jaws which may be supplemented by springs keeping the rollers in contact with the cams. However, at about the time the label is severed from the strip (Fig. XXXIV), the rollers contact with the lower dwell 117. This, therefore, opens the end folder jaws, as shown in Fig. XXXIV, the lower folder jaws being the only ones that move. Also during the previous operations of the machine the end folder jaws are at their in-position. Simultaneously with the end folder jaws being opened, the cam followers 112 and 113 ride up and on the projecting portions 114 and 115 of cams 108 and 109, respectively, and bring the jaws to their out-position, making the space between the same a trifle wider than the upper folder gripper plate. The gripper jaws are now dropped as hereinbefore described, and the projecting ends of the label wiped against the ends of the upper end folder jaws thus having the effect of completing half of the fold of the label, (Fig. XXXV). The position of stop 95 is such that the gripper folder plates when dropped are in line with the opening between the end folder jaws, as shown. When this position has been reached by the said gripper folder plates, the cam followers 112 and 113 disengage the portions 114 and 115 respectively. The end folder jaws are drawn inwardly and toward each other, due to the tension springs 118 and 119. This has the effect of folding the free ends of the label over the top gripper folder plate, as shown in Fig. XXXVI, and as the lower gripper folder plate is narrower than the upper one, it will not interfere in any way with this operation.

On the top end folder jaw 96 is the offset tapered spreader finger 120 (Fig. XXI). Therefore when the end folder jaws fold the label over the upper gripper folder plate as described, the spreader finger 120 will separate the lower gripper folder plate from the upper one, the distance between these plates due to the thickness of the label, preventing the finger from striking the edge of either one.

When the end folder jaws are at their in-position (Fig. XXXVI), the upper dwell 121 of cam 19 tilts the gripper rock arm forward and the gripper folder plates completely disengage the folded label, leaving the same between the open end folder jaws. It is the purpose of finger 120 to spread the gripper plates sufficiently so that they will not bind and displace the label while being withdrawn. Immediately after this operation of the machine the rollers 106 and 107 ride upon the upper dwell 116 of the cams 108 and 109. This, therefore, clamps the lower end folder jaws against the folded ends of the label to crease the same. As dwell 116 is about half the circumference of the cam, the lower end folder jaw is held in its upward position for a short time, and the same being heated, serves to make a permanent hot pressed and ironed crease.

Between the cams 108 and 109 and the upright arm 7 are securely fastened distance pieces 122 and 123 having ejector fingers 124 and 125 thereon. Therefore, when the rollers 106 and 107 ride from the higher to the lower dwell, the end folder jaws are separated and the fingers 124 and 125 serve to eject the label from the machine (Fig. XXXVIII).

On the side of each gripper jaw 27 and 28 is secured the studs 126 and 127 (Fig. XXII). As the gripper rock arm is brought forward, as previously described, these studs engage a wedge plate 128 adjustably secured to a bracket mounted on the base plate 1. It is evident, therefore, that as these studs act on the wedge, the gripper jaws will be spread apart as shown. When these jaws are spread far enough apart, the trip 52 (Fig. XVIII) will tilt downward, due to the weight of its lower horizontal projecting arm and the vertical extending arm of the same will rest against the catch 54. When the studs 126 and 127 disengage the wedge 128, the upper gripper jaw will snap down and finger 54 will engage the trip plate 55, thus setting the gripper in open position for receiving the next label as previously described.

Just after the gripper jaws have been set, as described, the slanting portion of cam 21 coacts with the cam roller 36 and the carriage is brought to the left and placed in its initial position. The gripper jaws are prevented from falling by being brought to rest on the cross piece 129, (Figs. VII and XXII). The said jaws are always held yieldingly downward against the table 18, the trip lever 61, the stop 95, the wedge 128 and the cross piece 129 by the tension spring 130 secured to the lower end of the rock arm 26. It is to be noted that as the gripper jaws advance toward the table 18 from their initial position, the gripper parts are so proportioned that the gripper folder plates will be brought to bear on the said table disengaging the jaws from any contact with cross piece 129 (Fig. VII).

The cams 108 and 109 I have best secured to the drive shaft 6 by the set screw 132 and a key but have also provided transverse setting of the same by means of the finger 133 which is fitted into the cam, as shown in Fig. XXVIII. This finger has the slot 134 through which passes a set screw 135. This adjustment permits of a variation in the distance between the end folder jaws by adjusting jaw 101 only and its associated cam 109. The bracket 136 and the base plate 1 are cut away at 137 (Fig. XXIX) to permit accessibility with a screw driver to set screw 135. A belt shifter 138 is adapted to shift a belt for stopping or starting the machine.

The operation of the machine just described is used where the label is a plain strip of cloth or a patch. However, should any name or design be woven into the label to make a projection thereon, I have provided a modification of the gripper plates to be governed by the projection and this obviates defective positioning of the label. In Fig. XL, this consists of the downwardly transverse projecting shoulder 140 formed on the upper gripper folder plate. In the upper gripper jaw is a set screw 141 adapted to vary the distance between the upper and lower gripper folding plates. It is evident, therefore, that the distance of the end of shoulder 140 from the top of the lower gripper folder plate may be varied and this distance is a trifle greater than the thickness of the plain label strip. But where a name or design has been woven into the said strip, the shoulder 140 will engage the weaving of the same. This, therefore, serves to give the proper length of label before the same is cut and eliminates the possibility of the label being severed through any of the woven letters thereon. The folded label A is shown in Fig. XXXIX.

I avoid creasing rolls and in so doing have accomplished valuable results. However, such gearing may be incorporated in the various mechanisms should it be desired.

The ironing feature in connection with the folding jaws insures a clean smooth and permanent crease.

I have also made many of the parts adjustable which easily permits different sized labels and patches to be folded.

In the description, I have generally used the term "label," but for the machine herein described, the term "patch" would also strictly apply. The modification will apply where a woven label is to be cut and folded. I have shown in Fig. XXXIX a folded label at A in which the ends only are folded and creased. Where patch is made use of, that is, cut from a strip of cloth without a selvage edge, the edges of the strip are folded as indicated at A' of Fig. XXXIX.

The folding ironing jaws are preferably positively actuated and permit no varying pressure when folding the label or patch. I have found this to be much better, than to use a variable folding pressure by spring or other means.

My machine is also capable of a much greater speed than those in present use and the structure which I have here shown is highly effective in all its various operations.

I have illustrated and described my improvements in detail in the form in which I have embodied the same for the market. I have not attempted to illustrate or describe all possible modifications and variations in structural details, which I contemplate, as I believe the disclosure made will enable those skilled in the art to which my invention relates to embody or adapt my improvements as conditions may require. I desire, however, to be understood as claiming my improvements specifically in the form illustrated as well as broadly as appears in the appended claims.

Having thus described my invention, what I claim as new and desire to secure by Letters Patent is:—

1. In a label cutting and folding machine, the combination of a suitable framework, a reel for the label or patch strip, tension rolls with suitable guides, label gripper folder plates for grasping the end label or patch, cam means for advancing the said jaws to pay out the label strip, a pair of shear blades disposed to cut off the end label, the upper shear of which is movable, a yielding clamp, a movable member of which is associated with the movable shear blade for grasping the end of the strip during the cutting to hold it after the label has been severed, folding ironing jaws disposed at the opposite ends of said label, means for depressing the label gripper folder plates between the upper of said folding ironing jaws to fold the ends of the label upward and locate the upper folder plate between the openings of said folding ironing jaws, means for advancing the said opened folding ironing jaws onto the opposite ends of the label, spreader means associated with said jaws for opening the gripper folder plates, cam means for closing the said jaws upon the folded ends of the label, means for withdrawing the gripper folder plates, electric heating means in the said folding ironing jaws, a carriage for carrying the gripper folder plates, a cam associated with moving parts for returning the said gripper folder plates to the initial position, coacting as described for the purpose specified.

2. In a label cutting and folding machine, the combination of a suitable framework, means for delivering a label or patch strip, label gripper folder plates for grasping the end label or patch, cam means for advancing the said folder plates to pay out the label strip, a pair of shear blades disposed to cut off the end label, the upper shear of which is movable, a yielding clamp, a movable member of which is associated with the movable shear blade for grasping the end of the strip during the cutting and to hold it after the label has been severed, folding ironing jaws disposed at the opposite ends of said label, means for depressing the label gripper folder plates between the upper of said jaws to fold the ends of the label upward and locate the upper folder plate between the openings of said jaws, means for advancing the said opened ironer jaws onto the opposite ends of the label, spreader means associated with said jaws for opening the gripper folder plates, cam means for closing the said jaws upon the folded ends of the label, means for withdrawing the gripper folder plates, electric heating means in the said folding ironing jaws, a carriage for carrying the gripper folder plates, a cam associated with moving parts for returning the said gripper folder plates to the initial position, coacting as described for the purpose specified.

3. In a label cutting and folding machine, the combination of a suitable frame-work, means for delivering a label or patch strip, means for grasping the end label, shears for cutting off the end label, a clamp associated therewith for engaging the end of said strip during the cutting operation to hold it after the label is severed, folding heated creaser jaws for engaging and folding the ends of the label, and means for releasing the said label and discharging it from the machine.

4. In a label cutting and folding machine, the combination of a suitable framework, means for delivering a label or patch strip, means for grasping the end label, shears for cutting off the end label, a clamp associated therewith for engaging the end of said strip during the cutting operation to hold it after the label is severed, folding ironing jaws for engaging and folding the ends of the label, heater means for said jaws, and means for releasing the said label and discharging it from the machine.

5. In a label cutting and folding machine, the combination of a suitable framework, a reel for the label or patch strip, tension rolls therefor, guides for the said strip associated with the tension rolls, a supporting tape or label strip guide on the frame, a pair of gripper folder plates, a carriage with a swinging part to which said gripper plates are pivoted, spring means for urging and holding the same in the closed position, a yielding catch disposed to hold the same in open position, a trip disposed to trip the catch and close the jaws when they are moved into engaging position with the strip, a cylinder cam on the driving shaft to the said machine, a lever with a cam roll associated with said cam to reciprocate and control the movements of the gripper carriage, a cut off means, and end folder means coöperating with said gripper folder plates, coacting as specified.

6. In a label cutting and folding machine, the combination of a suitable framework, means for delivering a patch or label strip, a supporting tape or label strip guide on the frame, a pair of gripper folder plates, a carriage with a swinging part to which said gripper plates are pivoted, spring means for urging and holding the same in the closed position, a yielding catch disposed to hold the same in open position, a trip disposed to trip the catch and close the jaws when they are moved into engaging position with the strip, a cylinder cam on the driving shaft to the said machine, a lever with a cam roll associated with said cam to reciprocate and control the movements of the gripper carriage, a cut off means, and end folder means coöperating with said gripper folder plates, coacting as specified.

7. In a label cutting and folding machine, the combination of a suitable framework, a reel for the label or patch strip, tension rolls therefor, guides for the said strip associated with the tension rolls, a supporting tape or label strip guide on the frame, a pair of gripper folder plates, a carriage with a pivoted part to which said gripper plates are pivoted, a stop on said pivoted part to hold said gripper in elevated position, spring means for urging and holding the same in the closed position, a yielding catch disposed to hold the same in open position, a trip disposed to trip the catch and close the jaws when they are moved into engaging position with the strip, a cylinder cam on the driving shaft to the said machine, a lever with a cam roll associated with said cam to reciprocate and control the movements of the gripper carriage, a cut off means, and end folder means coöperating with said gripper folder plates, coacting as specified.

8. In a label cutting and folding machine, the combination of a suitable frame work, means for delivering a patch or label, a pair of gripper folder plates with means for actuating the same to engage the end label, a carriage for carrying the said gripper, cam means actuated by a moving part to reciprocate the said gripper for feeding the label, a pivoted frame on said carriage, a longitudinally projecting arm thereon, a disk cam on the driving shaft, a plunger actuated by said cam coöperating with said arm to actuate the pivoted part to withdraw the gripper, a stop on said pivoted frame disposed to support the gripper after it has been withdrawn, as specified.

9. In a label cutting and folding machine, the combination of a suitable framework, means for delivering a patch or label, a pair of gripper folder plates with means for actuating the same to engage the end label, a carriage for carrying the said gripper, cam means actuated by a moving part to reciprocate the said gripper for feeding the label, a swinging frame on said carriage, a longitudinally projecting arm thereon, a disk cam on the driving shaft, a plunger actuated by said cam coöperating with said arm to actuate the swinging part to withdraw the gripper, as specified.

10. In a label cutting and folding machine, the combination of a suitable framework, means for delivering a patch or label, a pair of gripper folder plates with means for actuating the same to engage the end label, a carriage for carrying the said plates, cam means actuated by a moving part to reciprocate the said plates for feeding the label, means coöperating with one of said plates for folding the ends of the label, as specified.

11. In a label cutting and folding machine, the combination of a suitable framework, means for delivering a patch or label, a pair of gripper folder plates with means for actuating the same to engage the end label, a carriage for carrying the said gripper, a cylinder cam on the driving shaft, a lever on the frame slotted at its end for engagement by the cam at one end and connected at the other end to the said carriage, an adjustable fulcrum for the lever whereby the movement of the carriage can be accurately adjusted to the length of the label to be cut.

12. In a label cutting and folding machine, the combination of a suitable framework, means for delivering a patch or label, a pair of gripper folder plates with means for actuating the same to engage the end label, a carriage for carrying the said gripper, a cam, a lever coacting with said cam and connected to the said carriage to reciprocate the same, an adjustable fulcrum for the said lever, as specified.

13. In a label cutting and folding machine, the combination of cut off shears, a pivoted clamp member associated with said shears and having a spring engaging portion to contact with the label, and means for turning said clamp on its pivot by the cutting movement of the shears, as specified.

14. In a label cutting and folding machine, the combination of cut off shears having a movable blade, a spring for actuating the same for the cutting operation, a stop on said blade, a pivoted clamp member having a spring engaging portion, a spring urging said clamp member against the stop on said shear, a latch for locking said clamp in open position, a roller on said shear, a plunger with a cam surface for acting on said roller for opening the shear, with a projecting portion to trip the locking latch for the clamp member, a face cam on the driving pulley timed to actuate said plunger to open the shear and clamp during the feeding operation of the label, coacting as specified.

15. In a label cutting and folding machine, the combination of cut off shears having a movable blade, a spring for actuating the same for the cutting operation, a stop on said blade, a pivoted clamp member having a spring engaging portion, a spring urging said clamp member against the stop on said shear, means for actuating said shear timed to open the same during the feeding operation of the label, as specified.

16. In a label cutting and folding machine, the combination of a suitable frame, means for delivering a patch or label strip, gripper folder jaws for grasping the end label, means for cutting off the label, opposed pairs of end folding heated creaser jaws for folding the ends of the label positioned beneath in operative relation to coöperate with the gripper folder jaws, a support for the gripper folder jaws, a cam means for releasing the support to drop the gripper folder jaws between the end folders to partially fold the ends of the labels, cam means for advancing the end folder jaws onto the ends of the label, a wedge means carried by said end folder jaws for opening the gripper folder jaws as the end folder jaws advance onto the ends of the label, rollers on the gripper folder jaws, a wedge disposed in the path of the jaws to enter between the rollers to fully open the gripper folder jaws as they are withdrawn, means for withdrawing the gripper folder jaws, cam means for pressing the end folder jaws firmly together to iron and crease the label after the gripper folder jaws have been withdrawn, a heating means for the end folder jaws, coacting as specified.

17. In a label cutting and folding machine, the combination of a suitable frame, means for delivering a patch or label strip, gripper folder jaws for grasping the end label, means for cutting off the label, opposed pairs of end folding heated creaser jaws for folding the ends of the label positioned in operative relation to coöperate with the gripper folder jaws, means for moving the gripper folder jaws between the end folder jaws to partially fold the ends of the labels, cam means for advancing the end folder jaws onto the ends of the label, a wedge means carried by said jaws for opening the gripper folder jaws as the end folder jaws advance on to the ends of the label, means for withdrawing the gripper folder jaws, cam means for pressing the end folder jaws firmly together to iron and crease the label after the gripper folder jaws have been withdrawn, coacting as specified.

18. In a label cutting and folding machine, the combination of a suitable frame, means for delivering a patch or label strip, gripper folder jaws for grasping the end label, means for cutting off the label, opposed pairs of end folding heated creaser jaws for folding the ends of the label positioned in operative relation to coöperate with the gripper folder jaws, a support for the gripper folder jaws, a cam means for releasing the support to drop the gripper folder jaws between the end folders to partially fold the ends of the labels, cam means for advancing the end folder jaws onto the ends of the label, means for opening the gripper folder jaws as the end folder jaws advance onto the ends of the label, means for withdrawing the gripper folder jaws, cam means for pressing the end folder jaws firmly together to iron and crease the label after the gripper folder jaws have been withdrawn, coacting as specified.

19. In a label cutting and folding machine, the combination of a suitable frame, means for delivering a patch or label strip, gripper folder jaws for grasping the end label, means for cutting off the label, opposed pairs of end folding heated creaser jaws for folding the ends of the label positioned in operative relation to coöperate with the gripper folder jaws, means for moving the gripper folder jaws between the end folder jaws to partially fold the ends of the labels, cam means for advancing the end folder jaws onto the ends of the label, means for opening the gripper folder jaws as the end folder jaws advance onto the ends of the label, means for withdrawing the gripper folder jaws, cam means for pressing the end folder jaws firmly together to iron and crease the label after the gripper folder jaws have been withdrawn, coacting as specified.

20. In a label cutting and folding machine, the combination of a suitable frame, means for delivering a patch or label strip, gripper folder jaws for grasping the end label, means for cutting off the label, opposed pairs of end folding heated creaser jaws for folding the ends of the label positioned in operative relation to coöperate with the gripper folder jaws, means for moving the gripper folder jaws between the end folder jaws to partially fold the ends of the labels, cam means for advancing the end folder jaws onto the ends of the label, means for withdrawing the gripper folder jaws, cam means for pressing the end folder jaws firmly together to iron and crease the label after the gripper folder jaws have been withdrawn, coacting as specified.

21. In a label cutting and folding machine, the combination of a suitable frame, means for delivering a patch or label strip, gripper folder jaws for grasping the end label, means for cutting off the label, opposed pairs of end folding heated creaser jaws for folding the ends of the label positioned in operative relation to coöperate with the gripper folder jaws, means for moving the gripper folder jaws between the end folder jaws to partially fold the ends of the label, cam means for advancing the end folder jaws onto the ends of the label, means for withdrawing the gripper folder jaws, means for pressing the end folder jaws firmly together to iron and crease the label after the gripper folder jaws have been withdrawn, coacting as specified.

22. In a label cutting and folding machine, the combination of gripper folder jaws for grasping the label, opposed pairs of end folding heated creaser jaws for folding the ends of the label, means for moving the gripper folder jaws between the end folder jaws to partially fold the ends of the label, means for advancing the end folder jaws onto the ends of the label, means for closing the end folder jaws to crease the label as the gripper folder jaws are withdrawn, and heating means for the end folder jaws.

23. In a label cutting and folding machine, the combination of gripper folder jaws for grasping the label, opposed pairs of end folding heated creaser jaws for folding the ends of the label, means for moving the gripper folder jaws between the end folder jaws to partially fold the ends of the label, means for advancing the end folder jaws onto the ends of the label, and means for closing the end folder jaws to crease the label as the gripper folder jaws are withdrawn.

24. In an automatic label folder, the combination of means for supporting the label, pairs of folder heated creaser jaws at opposite ends of the label, means for advancing the same onto the label and closing them to fold and crease the label, and heating means for the said end folder jaws.

25. In an automatic label folder, the combination of means for supporting the label, pairs of folder heated creaser jaws at opposite ends of the label, and means for advancing the same onto the label and closing them to fold and crease the label.

26. In a label folding machine, the combination of label gripper folder jaws for embracing the label, end folder jaws coöperating therewith, a face cam means for advancing the end folder jaws onto the ends of the label, means for withdrawing the gripper folder jaws, a disk cam means for closing the jaws onto the label after the gripper folder jaws have been withdrawn, and heating means for the said jaws.

27. In a label folding machine, the combination of label gripper folder jaws for embracing the label, end folder jaws coöperating therewith, a face cam means for advancing the end folder jaws onto the ends of the label, means for withdrawing the gripper folder jaws, and a disk cam means for closing the folder jaws onto the label after the gripper folder jaws have been withdrawn.

28. In a label folding machine, the combination of label gripper folder jaws for embracing the label, end folder jaws coöperating therewith, cam means for advancing the end folder jaws onto the ends of the label, means for withdrawing the gripper folder jaws, cam means for closing the end folder jaws onto the label after the gripper folder jaws have been withdrawn, and heating means for the said jaws.

29. In a label folding machine, the combination of two pairs of end folder jaws, both jaws of one pair being spaced from both jaws of the other pair, one pair being adapted for gripping and creasing one end of the label and the other pair being adapted for gripping and creasing the other end of the label, and heating means for said jaws.

30. In a label folding machine, the combination of end folder jaws for gripping and creasing the ends of the labels, heating means for said jaws, a revolving shaft and discharge fingers carried by the shaft for discharging the label after it has been creased.

31. In a label folding machine, the combination with means for holding a label strip supply, means for withdrawing successive portions of said label strip from said supply, means for severing said portions from said label strip to form label lengths, and means coöperating with said withdrawing means to crease the end of said label length.

32. In a structure of the class described, the combination with a label strip supply, of means for withdrawing successive portions of said strip from said supply comprising relatively movable jaws, and means coöperating with one of said jaws to fold and crease the end of said label length.

33. In a structure of the class described, the combination with means for holding a label strip supply, of means for withdrawing successive portions of said label strip from said supply comprising relatively movable members, means for severing said portions of the label strip to form label lengths, and means coöperating with one of said movable members to fold the ends of said label lengths, said means comprising a heated member.

34. In a structure of the class described, a label feeding mechanism comprising relatively movable members, and means coöperating with one of said members to fold and crease the ends of labels.

35. In a structure of the class described, a label feeding mechanism comprising relatively movable members, and means coöperating with one of said members to fold the ends of labels.

36. In a label folding machine, a label supporting plate around whose opposite edges the ends of the label are adapted to be folded, means for holding the label on the plate, end folding members positioned adjacent said opposite edges respectively and having jaws, said members with their jaws being movable relatively to the plate into and out of a position in which the jaws of each said member press between them one of said edges of the plate with the end of the label folded over the same.

37. In a label folding machine, a label supporting plate around whose opposite edges the ends of the label are adapted to be folded, means for holding the label on the plate, end folding members positioned adjacent said opposite edges respectively and having jaws, said members with their jaws being movable relatively to the plate into and out of a position in which the jaws of each said member press between them one of said edges of the plate with the end of the label folded over the same, and means for heating said jaws.

38. In a label folding machine, an end folding member having jaws interrelatively movable, a label support around which the label is adapted to be folded and movable relatively to said member to a position between said open jaws to carry the folded label between said jaws, and thereupon to a position outside the jaws, means for closing the jaws on the folded label to crease the fold after the support has been withdrawn, and means for heating said jaws.

39. In a label folding machine, a gripper for holding a label, and spaced end folding members, the gripper having a movement relatively to said members, first from one side of said members to a position over the space between them, then to a position between them in which position the label's ends are foldingly engaged between said gripper and said members, and then to a withdrawn position from between said members and to initial position, and means for heating said members.

40. In a label cutting and folding machine, a carriage, a swinging arm on the carriage, and a gripper pivotally mounted on said arm and adapted to hold a label.

41. In a machine of the character described; cutting means for severing a label-length from a strip; feeding jaws adapted to feed a strip to said means; a carriage movable parallelly to the strip; a carriage supported by said first mentioned carriage and movable relatively thereto toward and away from the strip, and carrying by its toward movement the jaws which are mounted thereon to their position for feeding the strip, and by its away movement carrying said jaws from a severed label-length thereof.

42. In a machine of the character described; cutting means for severing a label-length from a strip; folding means for folding the ends of a severed label-length thereof; feeding jaws adapted to grasp the strip and feed the same to the cutting means and to carry a severed label-length thereof to the folding means; means for opening the feeding jaws to release the label-length; and means for retracting the feeding jaws from said label-length and acting subsequently to the acting of said jaw opening means.

In witness whereof, I have hereunto set my hand and seal in the presence of two witnesses.

ARTHUR ROSENTHAL. [L. S.]

Witnesses:
FRED W. KRAMER,
C. M. PAUL.

Copies of this patent may be obtained for five cents each, by addressing the "Commissioner of Patents, Washington, D. C."